United States Patent [19]
Causton et al.

[11] Patent Number: 5,702,513
[45] Date of Patent: Dec. 30, 1997

[54] CORRECTION AND MARKING MATERIALS

[75] Inventors: Brian Edward Causton, Reading; Michael Alexiou, Twickenham, both of United Kingdom

[73] Assignee: The Gillette Company, Boston, Mass.

[21] Appl. No.: 619,714
[22] PCT Filed: Sep. 28, 1994
[86] PCT No.: PCT/US94/11018
 § 371 Date: Aug. 2, 1996
 § 102(e) Date: Aug. 2, 1996
[87] PCT Pub. No.: WO95/09205
 PCT Pub. Date: Apr. 6, 1995

[30] Foreign Application Priority Data

Sep. 30, 1993 [GB] United Kingdom ............... 9320162

[51] Int. Cl.⁶ ..................................................... C09D 10/00
[52] U.S. Cl. ................................. 106/31.93; 106/31.96
[58] Field of Search ........................... 106/19 A, 19 B, 106/21 A

[56] References Cited

U.S. PATENT DOCUMENTS

| | | | |
|---|---|---|---|
| 5,147,457 | 9/1992 | Hino et al. | 106/19 |
| 5,199,976 | 4/1993 | Yau et al. | 106/19 A |
| 5,236,494 | 8/1993 | Kano | 106/19 R |
| 5,256,191 | 10/1993 | Thompson et al. | 106/19 A |
| 5,332,599 | 7/1994 | Sanborn | 427/259 |
| 5,338,775 | 8/1994 | Matz et al. | 523/161 |
| 5,403,872 | 4/1995 | Koreska | 106/19 A |
| 5,453,120 | 9/1995 | Rendino et al. | 106/19 B |
| 5,480,920 | 1/1996 | Sharma et al. | 106/19 A |
| 5,578,117 | 11/1996 | Matz et al. | 106/19 A |

FOREIGN PATENT DOCUMENTS 0 570 810  5/1993  European Pat. Off. ........ C09D 13/00

*Primary Examiner*—Helene Klemanski
*Attorney, Agent, or Firm*—Ladas & Parry

[57] ABSTRACT

A hand-held correction or marking material (20) comprises a solid synthetic matrix (26) containing a correction or marking material. The matrix is such that when it is drawn over and in contact with a paper or similar surface, it deposits thereon as a thin dry coating which is immediately hard. The matrix can liquify temporarily in the contact area and then immediately resolidify in the form of the thin coating. The correction materials comprise an opacifier such as titanium dioxide, and the marking materials comprise a colored pigment or dye in the matrix.

23 Claims, 13 Drawing Sheets

FIG. II

CORRECTION AND MARKING MATERIALS

This invention relates to correction and marking materials and to correction and marking instruments comprising such materials.

Correction fluids are white paints which can be used to cover writing, typing and drawing errors and which, when dry, can be typed, written or drawn over. These fluids generally comprise an opacifying agent (usually a white pigment such as titanium dioxide), a polymeric binder, and a volatile or aqueous liquid medium in which the binder is soluble or dispersible. These fluids are normally used from small bottles equipped with an applicator brush but because the fluid must be very quick drying this system of application is prone to clogging and caking problems. They are also available in pen-like forms with rollers at the tip which dispense the correction fluid from an enclosed reservoir, and hence are substantially free from caking and clogging problems, but these are inconvenient for covering writing or typing. It is possible to mitigate these problems to some extent, but this requires more complex arrangements which add to the cost.

It is also known to provide correction fluids in the form of "solid" paint sticks (see, for example, European patent specification no. 0513498). These "solid" paints are actually highly viscous thixotropic liquids consisting of a liquid phase and solids. They are normally wet to the touch, and upon application of any shear they revert to liquid. When they are used as correction fluids, they are laid down as a liquid and a significant time is then needed for the solvent(s) to evaporate to leave a dry coating.

All correction systems which rely on a stored correction fluid in one form or another encounter the problem of drying-time: whether the fluid is a volatile or an aqueous solution, the necessity of waiting between 10 and 40 seconds (at least) before the corrected surface can be written over is an inherent disadvantage of the system. There is therefore a need for a correction system whereby correction opacifiers can be conveniently applied to a substrate, usually paper, to cover writing, typing, etc. but in which they are not stored or held in a liquid, and can be written over immediately after application to a substrate.

Marking instruments, by which is meant instruments for writing, drawing or other marking, typically involve either (a) application of an ink or other fluid to a paper or other substrate, conventionally (and necessarily) including a reservoir for the fluid storage and means for conducting the stored fluid to the marking tip for application to the substrate, or (b) deposition on to the paper or other substrate, by abrasion or smearing, of a solid marking material e.g. as in the case of a pencil or wax crayon.

In the case of (a) there is always a risk of evaporative dry-out, or of leakage of the fluid from the nib or tip of the instrument, and the consequent need of providing a cap or cover to avoid these risks, and also to protect the nib or tip from damage or from staining clothes. In the case of conventional ink there is also the need to let the ink dry before it is contacted. For these and various other reasons, the construction of such marking instruments is often more complex and costly, and the risks of malbehaviour are never entirely eliminated. In the case of (b) the marking material frequently lacks structural strength and stability and is hence prone to damage or breaking, and in some cases to staining if inadvertently brought into contact with paper or clothes.

We have now devised a new correction or marking material whereby the principal problems outlined above can be reduced or overcome.

In particular, and in accordance with a feature of the present invention, we have devised a carrier matrix for a correction or marking agent, which matrix whilst solid can be made temporarily liquid for deposit on a substrate, and immediately thereafter hardened. In this way, the advantages of solid systems are maintained whilst also achieving the advantages of liquid application to a substrate, and in addition very short "drying" times (whilst the matrix resolidifies) can be achieved.

In one aspect, the invention provides a correction or marking material which comprises a correction or marking agent in a solid synthetic matrix, which material, when moved in contact with and relative to a substrate; liquefies at least partially to deposit itself on the substrate as a thin coating of matrix and agent, which coating immediately resolidifies to form a dry layer.

In another aspect, the invention provides a correction or marking material which comprises a correction or marking agent in a solid synthetic matrix, the material being a non-malleable solid substantially free from solvent and from wax, which material when moved in contact with and relative to a substrate, deposits thereon as a thin coating which is substantially immediately hard.

In one form of the present invention, we provide a correction or marking material which comprises a solid synthetic matrix which in use is generally a rigid (but not necessarily completely rigid) and stable solid not prone to evaporation, leakage, breakage or staining but which during use, when a region thereof is moved in contact with and relative to a substrate, liquefies in that region to deposit itself on the substrate as a thin coating which immediately resolidifies into a dry layer when out of contact with the region.

In a further aspect, the invention provides a correction or marking instrument in which the material to be deposited on the substrate is a correction or marking material of the invention.

The correction or marking materials of the invention comprise a synthetic matrix which is solid under ambient conditions. In usual use, the matrix is moved on the substrate whereupon, in the contact region, it liquefies to deposit itself on the substrate. The degree of liquefaction need only be partial and can be sensed by the user experiencing a sudden reduction in drag so that the matrix then moves smoothly over the substrate. The liquefied matrix exhibits inelastic flow and is also to be contrasted with the smearing effect exhibited by wax crayons and other smearable solids. The change of phase from solid to liquid and then back to solid appears to be of the nature of melting and, in the case of materials which have the requisite melting temperature, sharpness of melting point or other properties, the change of phase occurs automatically under the conditions of use as a result of temporary pressure frictional forces and heat applied to the region in contact with the substrate. Use of this temporary liquefaction is believed to be a novel feature of marking and correction systems.

The matrix resolidifies immediately it is out of the contact region. The complete hardening will normally take only a few seconds. Generally the deposited layer is ready to receive printing or writing, for example, in much less than 20 seconds, usually less than 10 seconds and often in no more than about 5 seconds. References herein to the substantially immediate solidification of the coating are to be understood in this context.

The matrix used in the present invention is a solid and this is loaded with a marking agent such as a dye or pigment, or an opacifying agent such as titanium dioxide.

In the case of correction materials, opacifying agents other than titanium dioxide will be known to those skilled in the art. Suitable materials include., for example, zinc oxide, zirconium oxide, clays, silicates and calcium carbonate. Preferably, the opacifying agent will be a finely divided solid substantially homogeneously distributed throughout the matrix. In use, as the matrix liquefies to deposit on the paper, the opacifying agent is carried with it to form an opaque thin layer on the paper. In contrast to conventional correction fluids, however, the correction coating applied with a correction material of the present invention will be immediately dry as the matrix solidifies. The matrix will not usually contain any solvent or fluid medium. The loading of opacifier will vary depending on the nature of the matrix and the agent, but normally the greater the loading the better the cover obtained. We have found that opacifying agent contents of up to 80% or more can be achieved (based on the total weight of matrix and agent).

The correction instruments of the invention can take a variety of forms, the simplest being a shape consisting solely of the matrix with the opacifying agent and any other desired materials carried therein. One especially preferred shape is a simple stick, of any desired cross-sectional shape, which can be hand held and used in similar manner to a conventional writing instrument. However, if desired, other shapes can equally be used. The stick (or other shape) can be mounted in a holder for ease of use as desired. Since, in use, the stick is gradually used up and shortened, the holder should permit movement of the stick to accommodate this shortening.

In a preferred aspect, the stick (or other shape) is a rigid self-supporting unit which is dry to the touch with no bleeding or loss of any components therefrom upon contact by the user. In a particularly preferred arrangement, the correction stick will be dry and non-tacky to the touch, and will not contain any aqueous or organic solvents.

The matrix itself must have an appropriate liquefaction temperature so that it will become fluid at the region in contact with the paper (or other substrate) only upon use. The liquefaction may be due to pressure or to friction with the paper, or both, provided that the desired property is achieved. After removal of the stimulus, the matrix must set or harden immediately so that the stick (or other shape) remains dry and relatively rigid and the coating on the paper can immediately be written over as desired. Usually, the melting point of the compositions will be between about 45° and 55° C., often from about 47° to about 51° C., but this is not critical.

The matrix can be made of a wide variety of materials. Generally, we prefer not to use polymeric long chain materials since they do not usually have a sharp melting point. One preferred composition comprises a mixture of two different types of material, namely at least one first component to provide the desired degree of structural rigidity, and at least one second component to provide fluidity. In order to possess the required structural rigidity, the first component will be characterised by the presence of structural features which limit free rotation and flexing of groups within the molecule. Suitable structural features are the presence of fused rings, unsaturated bonds or aromaticity. Preferred materials will contain two or more fused organic rings and some degree of unsaturation. Preferred such compounds include abietic acid and its derivatives. Suitable substituted naphthalene or anthracene compounds may also be used, for example.

Certain substituted biphenyl-compounds can also be used as first component compounds, including for example 2-biphenylcarboxylic acid, 4-biphenylcarboxylic acid, diphenic acid, 4-biphenylcarboxaldehyde, 2,2-biphenol and 4,4-biphenol. Of these biphenyls, we prefer to use the acids, particularly in combination with (as second component) cetyl or myristyl alcohol. One or more first component compounds can be used.

Suitable second component compounds, which are intimately mixed with the first, will possess the ability to rotate and flex freely. Preferred such compounds include long chain aliphatic compounds, such as the acids or alcohols, for example the lauryl, stearyl, cetyl or myristyl compounds, and lipid-like materials such as from the class of compounds known as ceramides. One or a mixture of second component compounds can be used.

Preferably, the first and second components are such that hydrogen bonding occurs between them. Thus, if for example the first component is an acid, the second component is preferably an alcohol. Alternatively, the first component can be an alcohol and the second component an acid, for example. The relative amounts of the two components can vary widely depending on the materials themselves. Generally, the composition will comprise from 5 to 17.5% by weight of each of the components. More preferably, the amount of each component is from 8 to 15%, and most preferably from 10 to 15%. The relative proportions can vary. In the particular case of acid biphenyls (first components) and long chain alcohols (second components) the preferred proportions are about 3:1 alcohol to acid, but for abietic derivatives and long chain alcohols or acids, the ratio is normally in the range 2:1 to 1:2, most especially about 1:1.

The correction and marking materials of the invention are substantially free of solvent. We prefer the materials to be totally solvent free since in general there is usually no advantage to having any solvent present and, indeed, there may be disadvantages. However, small quantities eg. up to about 3% or so can be tolerated and this is what is meant by "substantially free". The disadvantages of having solvent present include the extended "drying" time, the possibility of bleed from the material, especially when handled, and the necessity then to keep the material in a container to reduce evaporative solvent loss.

It is possible to include a small amount of water, eg. up to about 3%, in the materials of the invention. This can make the materials slightly softer. However, its presence is not essential. The water is in a bound state in the material and is not lost by evaporation (in contrast to conventional solvents in correction fluids).

The correction and marking materials of the invention are substantially free of waxes. Waxes have low cohesive strength, are malleable and when smeared on to paper, for example, do not form a hard coating which can be written or typed over. In contrast, the materials of the present invention are not malleable and when applied to paper by the instant liquefaction described, form a hard coating which can be written or typed over. The materials of the invention are thus quite different from wax crayons and the like. Whilst we prefer that the materials of the invention be completely free of wax, they can contain small amounts, eg. up to about 3%. And this is what is intended by "substantially free".

In conventional liquid correction and marking materials, the liquid as applied must dry by evaporation of solvent therefrom, so that the thin dry layer formed on the substrate is actually of different composition from the liquid. In contrast, the thin dry layer formed by application of a correction or marking material of the invention is of the same composition as the material before application. Thus, the solid material is softened to liquid state at its application and thereafter quickly solidifies to its former solid state but now in the form of a thin layer on the substrate. Because no evaporation is required for "drying", the time taken to form a hard dry layer is very short.

Many matrices of the invention show certain properties similar to materials known as liquid crystals, and tests of these materials by polarising microscope can show the birefringence typical of liquid crystals.

As will be clear to those skilled in the art, the exact properties (e.g. melting point, rigidity, load capacity etc.) of the matrix will depend on its constitution, eg. on the nature and relative proportions of the first and second components used. For example, by using equal amounts of the two components but varying the nature of one component, products of different hardness and rigidity can be obtained. Similarly, varying the proportions of components (keeping the components themselves unchanged) will also alter properties of the product. It will be a matter of routine trial and experiment to determine the optimum arrangement in any particular case.

One important feature is the "feel" of the material as it is drawn across a paper (or other surface) to deposit a thin layer thereon. The matrix preferably needs to be chosen so as to give a "feel" which is neither too hard nor too soft. Also, the integrity of the loaded material is important: it does not want to be too soft and friable (and hence easily broken) nor too hard and brittle. In general, the properties of the matrix can be varied in a continuum by appropriate adjustments of proportions and/or components.

The materials of the invention are applied to substrates, eg. paper, in the coating thicknesses normally used in the correction art. For example, layers of thickness of the order of 50 μm (microns) can be used, but thicker or thinner layers can be formed depending on the precise formulation and on the manner of use. Thicknesses greater than about 100 μm (microns) are not usual.

In another aspect, the invention relates to writing, drawing or other marking materials and instruments (as opposed to correction materials and instruments). The marking materials of the invention comprise a solid synthetic matrix as described above having a dye or other marker therein so that, as the matrix is applied to paper (or another substrate) the matrix liquefies and deposits itself as a thin substantially immediately dry layer on the paper and carries with it the marking agent so that the layer is visible.

The description hereinabove in relation to correction materials and instruments applies equally to the marking materials and instruments except that the matrix carries a marking material and not (or usually not) an opacifying agent. Most preferably, the marker chosen is one which will not bleed from the matrix. It may, for example, be a pigment, or a dye or ink, or it may be a fluorescent type of material for use as a "marker pen". Fillers such as calcium carbonate can be included if desired, for example to bulk out the formulation in place of dye or pigment.

In one method of manufacture of the correction or marking materials of the invention, the matrix materials are thoroughly mixed, usually in solution in an organic solvent, and the correction or marking materials are added, e.g. in powder form, and thoroughly dispersed. The fluid mix can then be placed in a mould or otherwise shaped e.g. by extrusion, and the solvent removed, to give a solid rigid shaped article.

An alternative procedure involves the use of a co-rotating extruder. In this method, the components of the material are pre-mixed as solids and then fed into the extruder whose screw profile is configured to break down any agglomerated particles (eg. TiO$_2$ particles) and disperse them in the material. This alternative procedure avoids the use of solvents and also can give improved opacity due to the improved packing of the pigment particles resulting from them being uniform in size and closer to the optimum particle size. Where it is desired to include up to 3% water in the materials, this can be injected into the extruder. The extrudate can be of the desired shaped for ultimate use, or it may be placed immediately in moulds.

It is a feature of many of the correction and marking materials of the invention that they are effective on a variety of surfaces, including for example paper, painted and unpainted metal, wood and glass.

In order that the invention my be more fully understood, the following Examples are given byway of illustration only.

EXAMPLE 1

Various amounts of hydrogenated abietic acid and an alcohol (see Table I) were dissolved in dichloromethane. Finely divided titanium dioxide pigment was added. After thorough mixing the solvent was stripped off under reduced pressure. The resulting solid was transferred to a syringe to form sticks in the barrel thereof. Then, after removal of the nozzle, the sticks were ejected for further testing. Stick A had good integrity and gave good correction over all types of inks (i.e. over anionic, cationic and neutral ball pen inks). The stick had rather a hard "feel" on paper. Stick B was softer and provided good correction. Sticks C and D were softer and more friable, and quite easily broken. Stick E was softer than stick A And stick F was the hardest of all. All the sticks gave satisfactory performance.

TABLE I

| | % TiO$_2$ | % Hydrogenated Abietic Acid | % Alcohol |
|---|---|---|---|
| A | 80 | 10 | 10 stearyl |
| B | 80 | 10 | 10 cetyl |
| C | 80 | 10 | 10 myristyl |
| D | 80 | 10 | 10 lauryl |
| E | 80 | 15 | 5 stearyl |
| F | 80 | 5 | 15 stearyl |

EXAMPLE 2

As an alternative method of preparation, equal amounts of hydrogenated abietic acid and stearyl alcohol were heated to 75°–80° C. to provide a fluid melt. Titanium dioxide pigment was added and dispersed using a Dispermat dispersator. The maximum loading of pigment achievable was only about 75% of that achieved in Example 1, but the product produced was a satisfactory correction stick.

EXAMPLE 3

Rectangular cross section sticks were prepared from the materials of the invention prepared as in Example 1 or 2. These sticks are suitable for use in a Keskal stick or a Staedtler Tops tar holder. The sticks can be made by stamping them out using appropriately dimensioned 3-part moulds under 5 tons pressure.

Circular cross-section sticks have been made of a size suitable for use as "leads" in clutch pencils, by extrusion. Usually, a small amount of heating together with pressure are required to make the loaded matrix materials flow through the extrusion nozzle, but substantial lengths of extrudate were made which were then broken into sections of appropriate size for use.

EXAMPLE 4

A highlighter stick was made of the following formulation:

| | |
|---|---|
| Nova-Glo SX | 20% |
| Calcium carbonate | 60% |
| Cetyl alcohol | 10% |
| Hydrogenated abietic acid | 10% |

EXAMPLE 5

An ink stick was made of the following formulation:

| | |
|---|---|
| Pigment black 7 | 60% |
| Cetyl alcohol | 4% |
| Stearyl alcohol | 16% |
| Hydrogenated abietic acid | 20% |

EXAMPLE 6

Sticks were prepared according to the following formulation including a plasticiser, dioctyl sebacate.

| | % |
|---|---|
| $TiO_2$ | 75 |
| Hydrogenated abietic acid | 12.4 |
| Stearyl alcohol | 10.0 |
| Cetyl alcohol | 2.5 |
| Dioctyl sebacate | 0.1 |

EXAMPLE 7

The following stick formulation was prepared based on 4-biphenylcarboxylic acid.

| | % |
|---|---|
| $TiO_2$ | 60 |
| 4-biphenylcarboxylic acid | 10 |
| cetyl alcohol | 30 |

EXAMPLE 8

| Highlighter formulation | % |
|---|---|
| Fluorescent Brilliant Yellow R | 1 |
| Hydrogenated abietic acid | 47 |
| Stearyl alcohol | 52 |

EXAMPLE 9

| Ink Stick formulation | % |
|---|---|
| Pigment blue 15 | 60 |
| Hydrogenated abietic acid | 60 |
| Stearyl alcohol | 16 |
| Cetyl alcohol | 4 |

EXAMPLES 10–25

Correction sticks of the compositions shown in the following Table were prepared by premixing the solid components and extruding them with (where indicated) a small amount of water. All the sticks produced had good properties as correction sticks, and when drawn over a substrate deposited as a thin dry correction layer.

TABLE

| Example | $TiO_2$ grade | % $TiO_2$ | % Foral AXE | % Stearyl alcohol | % Cetyl alcohol | % Water |
|---|---|---|---|---|---|---|
| 10 | R900 | 65 | 16.09 | 16.21 | 2.70 | 0 |
| 11 | R900 | 66 | 15.61 | 15.74 | 2.65 | 0 |
| 12 | R900 | 67 | 15.18 | 15.28 | 2.54 | 0 |
| 13 | R900 | 68 | 14.69 | 14.74 | 2.47 | 0 |
| 14 | R900 | 69 | 14.25 | 14.36 | 2.39 | 0 |
| 15 | R900 | 70 | 13.80 | 13.89 | 2.31 | 0 |
| 16 | R900 | 71 | 13.33 | 13.44 | 2.23 | 0 |
| 17 | R900 | 72 | 12.88 | 12.96 | 2.16 | 0 |
| 18 | R900 | 73.24 | 12.11 | 12.21 | 2.04 | 0 |
| 19 | R900 | 72 | 12.45 | 12.55 | 0 | 3 |
| 20 | R900 | 73.24 | 11.83 | 11.93 | 0 | 3 |
| 21 | R700 | 72 | 12.45 | 12.55 | 0 | 3 |
| 22 | R700 | 73.24 | 11.83 | 11.93 | 0 | 3 |
| 23 | R104 | 71.18 | 13.68 | 13.65 | 0 | 1.49 |
| 24 | R104 | 71.08 | 12.96 | 12.97 | 0 | 2.99 |
| 25 | R104 | 73.21 | 12.12 | 12.25 | 2.24 | 0 |

Foral AXE is a tradename of Hercules used to describe a particular grade of abietic acid in which a high proportion of the Unsaturation has been removed by hydrogenation. Of the indicated $TiO_2$ grades (from du Pont), R900 has a surface treatment of alumina and R700 and R104 have an organic surface treatment in addition to the alumina. R700 grade is preferred when water is present.

EXAMPLE 26

Two blue pastel writing compositions were made as follows:

| | A | B |
|---|---|---|
| $TiO_2$(R900) | 70% | 71% |
| Foral AXE | 12% | 12.65% |
| Stearyl alcohol | 12%. | 12.65% |
| Cetyl alcohol | 2.6% | — |
| Water | 2.9% | 0.5% |
| Victoria Blue B | 0.5% | 0.5% |

They were both very satisfactory.

EXAMPLE 27

Two highlighter compositions were made as follows:

| | A | B |
|---|---|---|
| 2,2'-biphenol | 49.5% | 47.68% |
| Cetyl alcohol | 50% | 48.26% |
| Pigment yellow 101 | 0.5% | — |
| AA216 dye (L.B. Holliday) | — | 0.02% |
| OBA140 optical brightener | — | 4.04 |

They were both very satisfactory.

EXAMPLE 28

Ceramides used as substitutes for part or all of the long chain alcohols described in the above formulations, result in satisfactory compositions of the invention.

EXAMPLE 29

Sticks made by the method of Example 1 but using 9-anthracene carboxylic acid instead of the abietic acid derivative were made.

In order that the invention may be more fully understood, reference is made to the accompanying drawing, in which.

Figure 1:
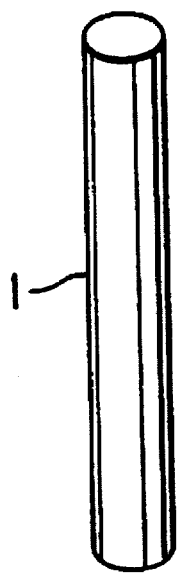
FIG. 1 is an elevational view of one embodiment of stick in accordance with the invention.

Referring to the drawings, FIG. 1 shows a cylindrical solid stick 1 made of a correction or marking material of the invention. The stick is of circular cross-section but may be of other sections. It can be handled at ambient temperatures without loss of opacifier or pigment And is self-supporting. It may be provided with a bevelled end portion to facilitate use.

Figure 2:
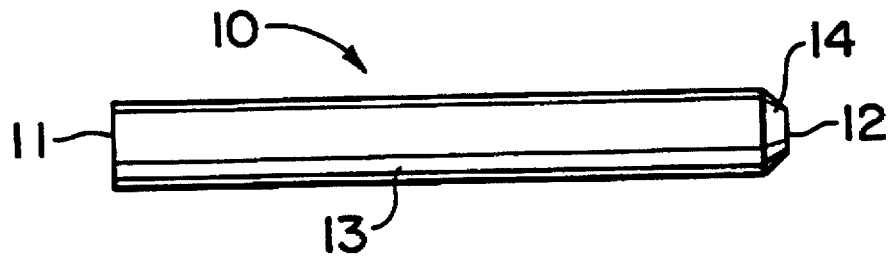
FIG. 2 is an elevational view of one embodiment of a holder for the stick of FIG. 1.

FIG. 2 shows a stick-holder 10 for receiving a stick of the invention. The holder is tubular and is closed at one end 11 and open at the opposite end 12 through which a stick (not shown) would project. The barrel 13 houses a stick (not shown) and means are provided to advance the stick out of open end 12 as it is consumed in use. The open end 12 of the holder has a bevel 14 to narrow the bore for a close fit with a stick.

Figure 3:
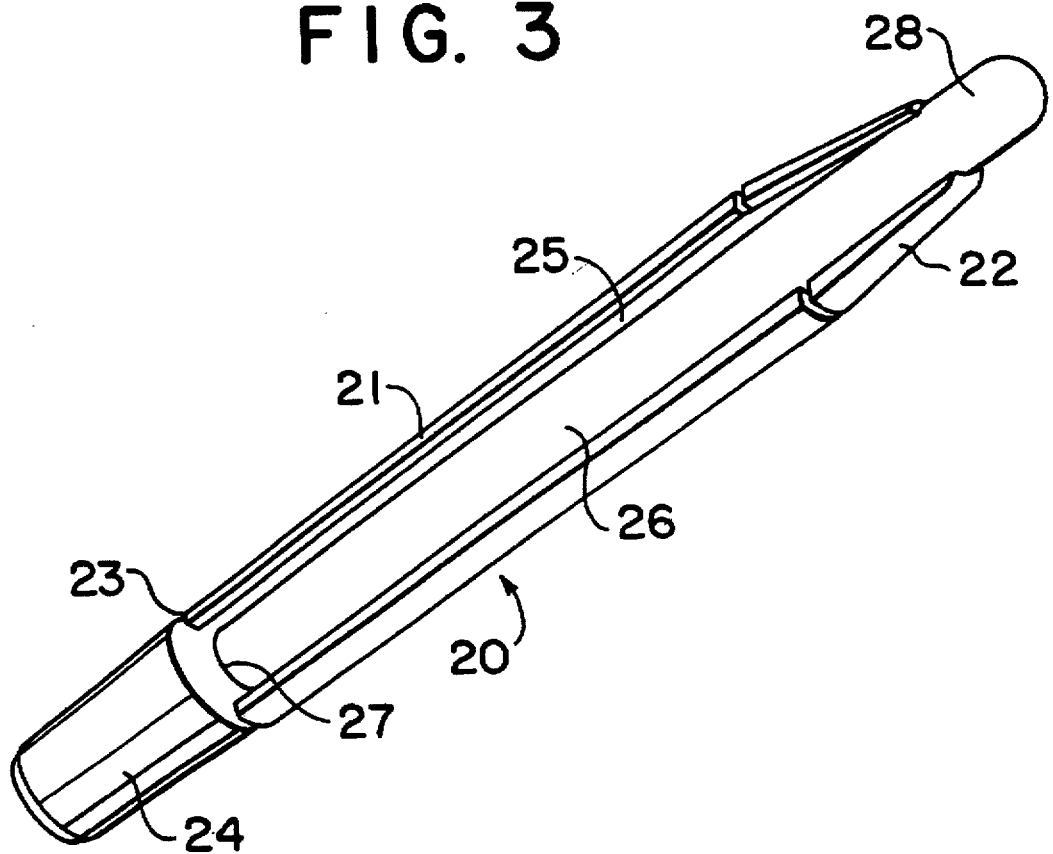
FIG. 3 is a part cut-away orthogonal view of a second embodiment of holder with a stick of the invention therein.
Figure 4:
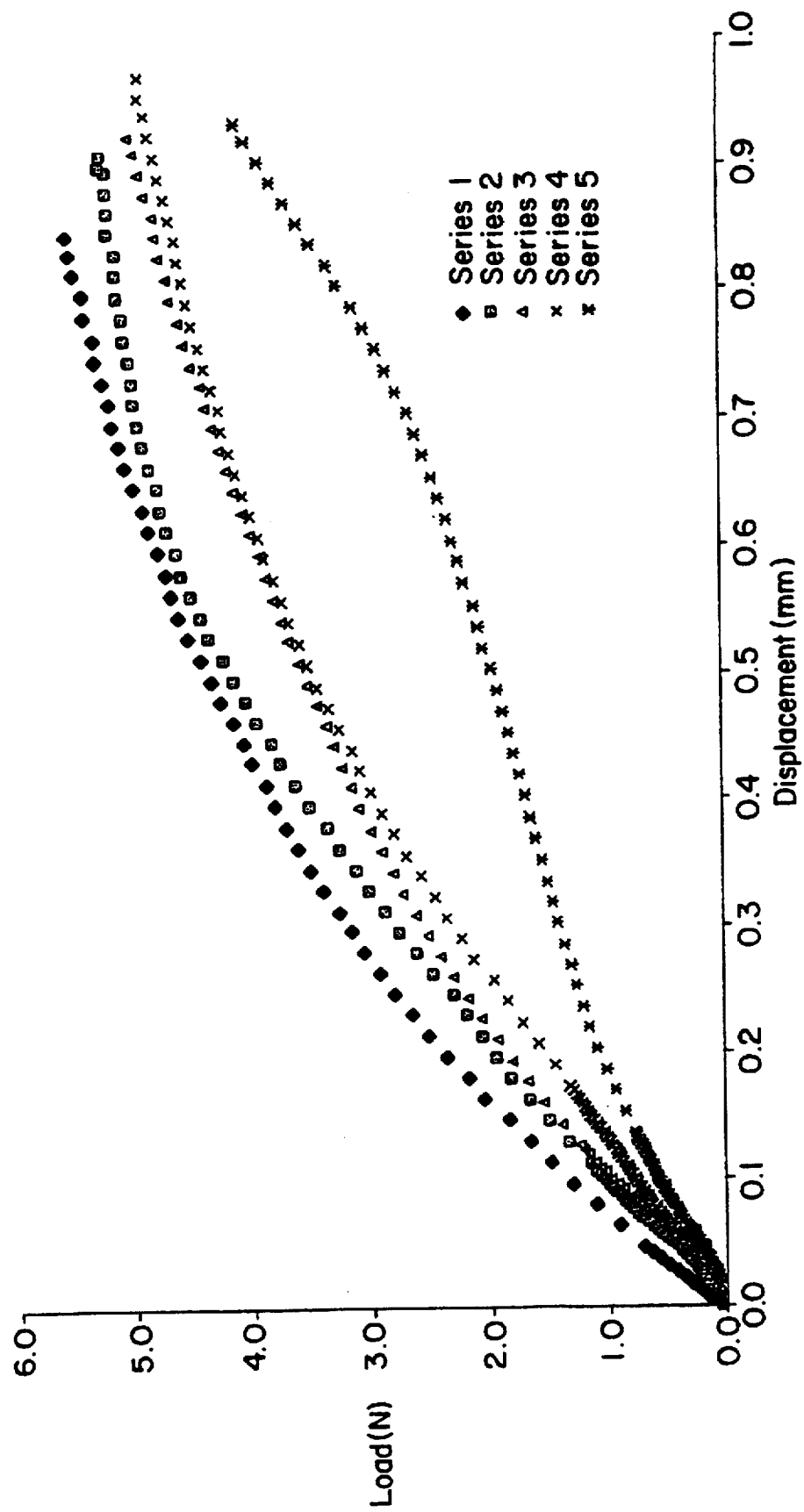
FIGS. 4 to 14 are load displacement curves from a series of tests on materials of the invention (FIGS. 7, 8, 13 and 14) and prior art materials (FIGS. 4, 5, 6, 9, 10, 11 and 12).
Figure 5:
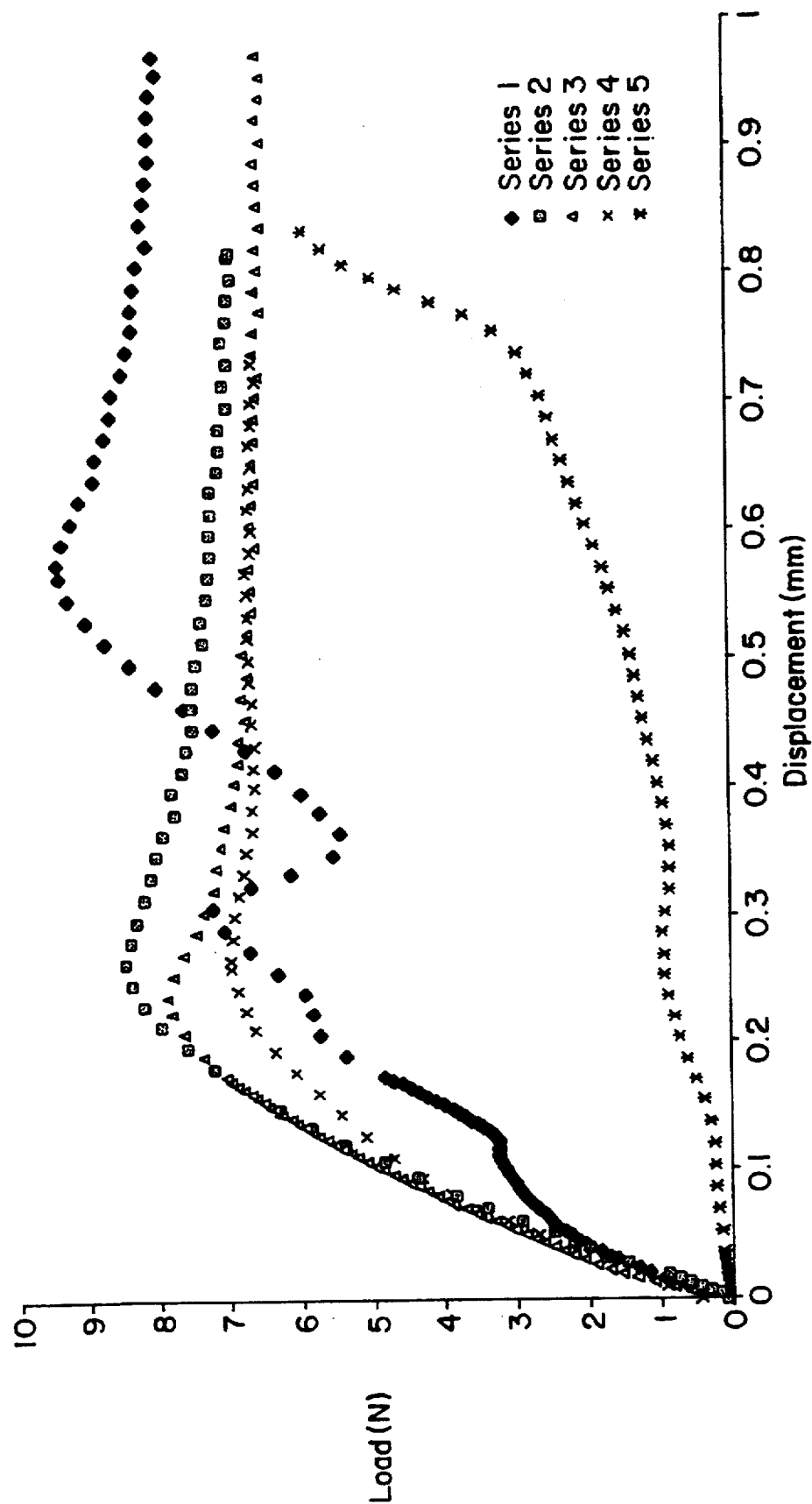
Figure 6:
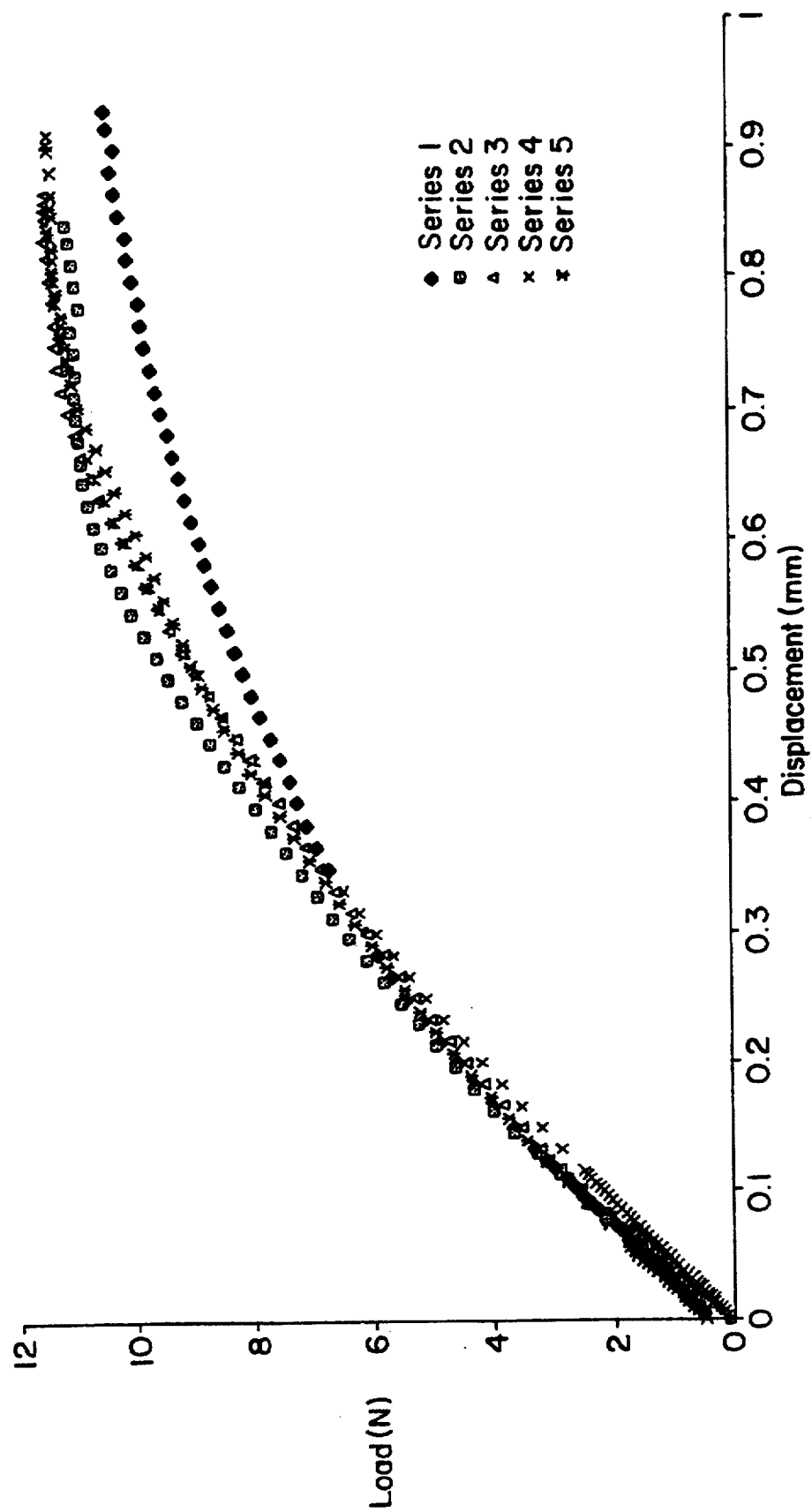
Figure 7:
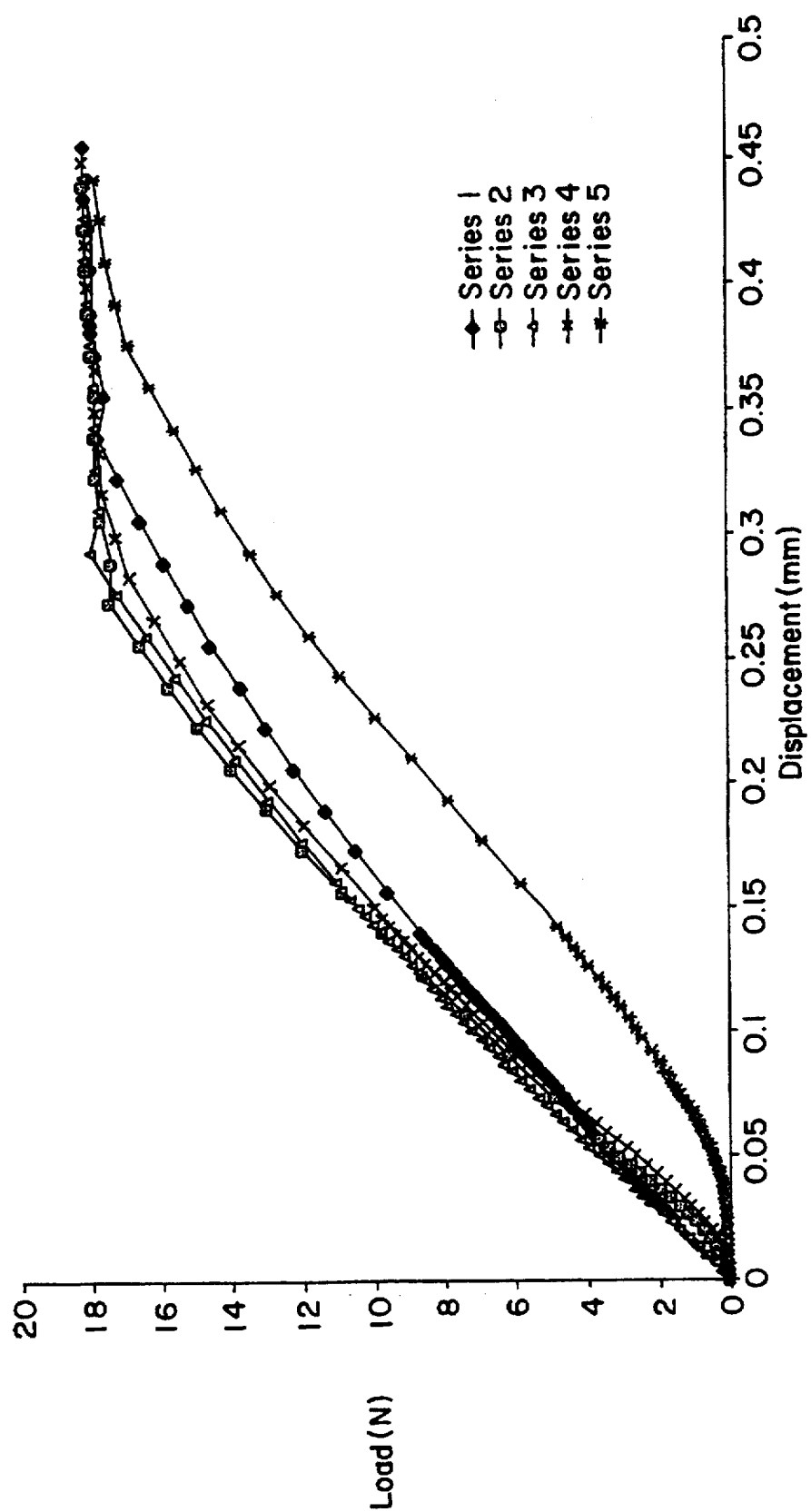
Figure 8:
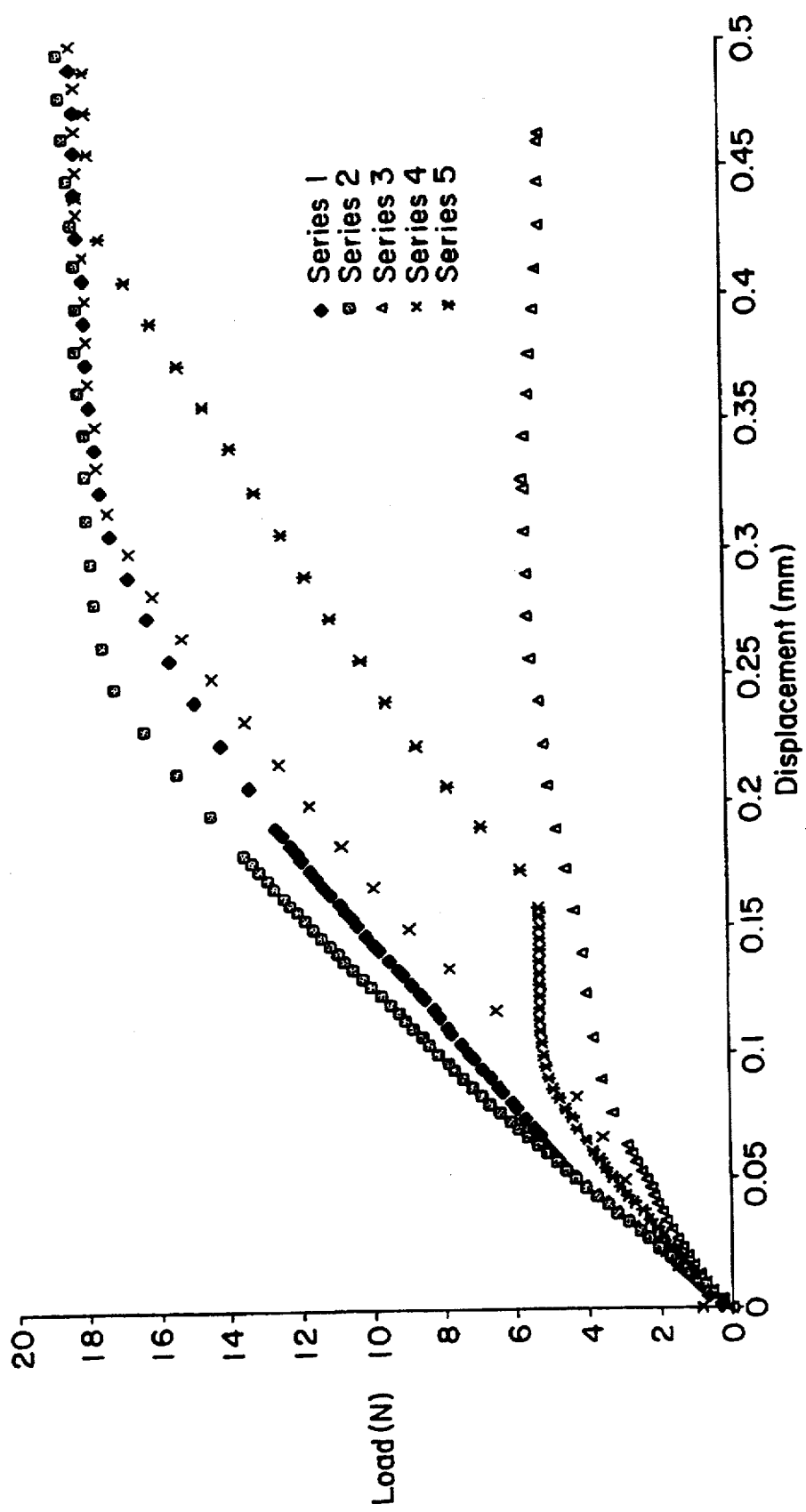
Figure 9:
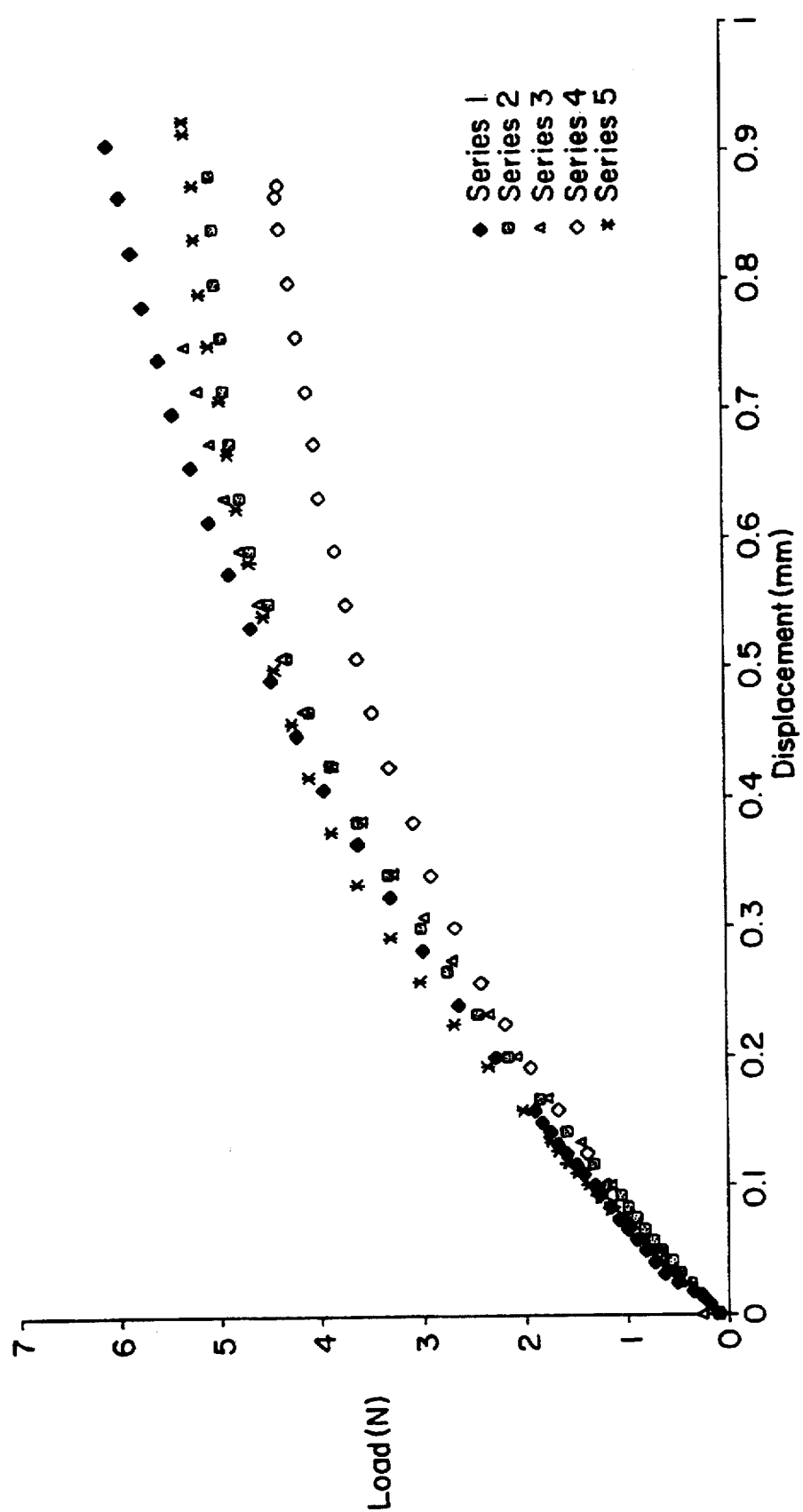
Figure 10:
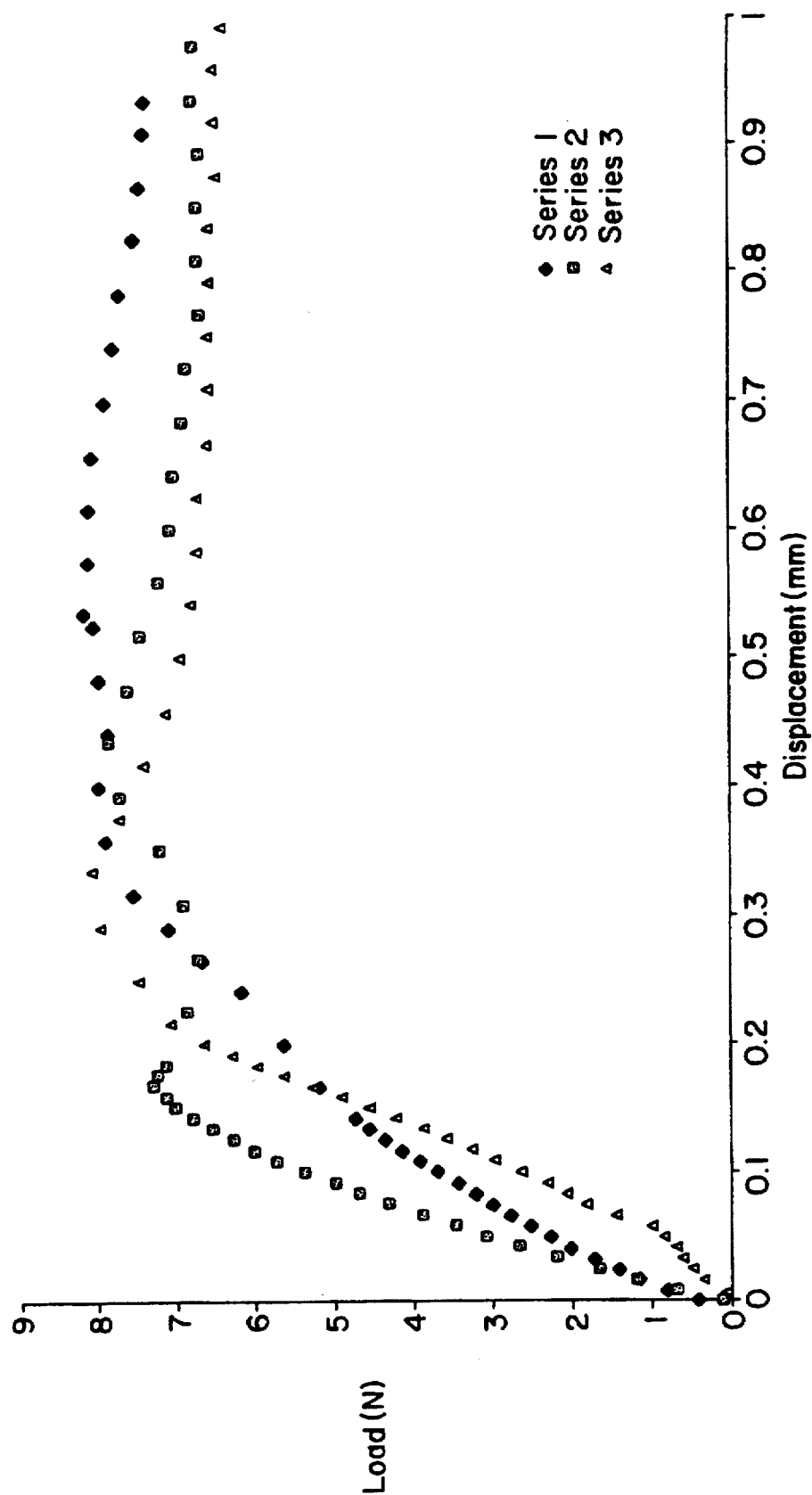
Figure 11:
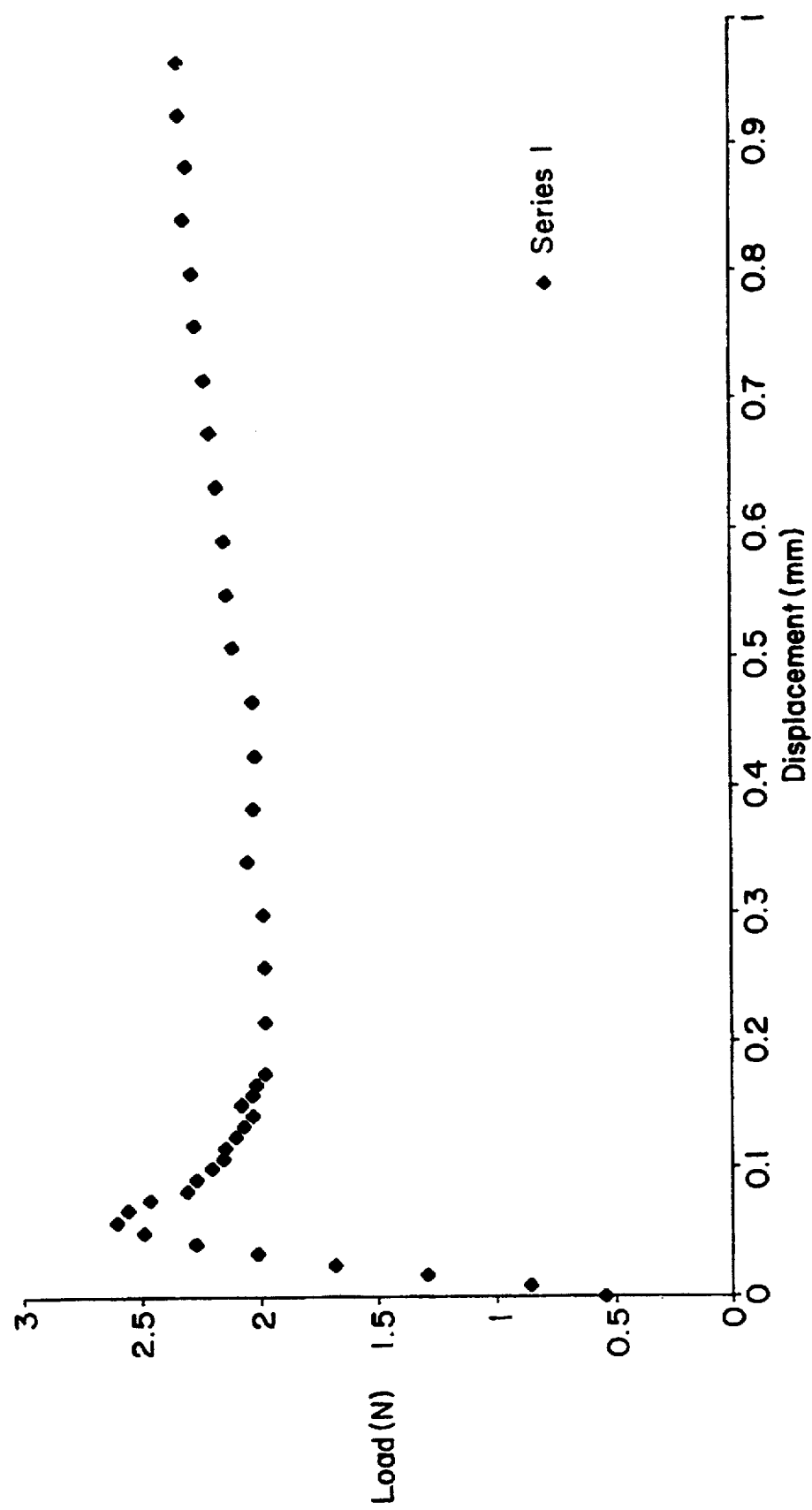
Figure 12:
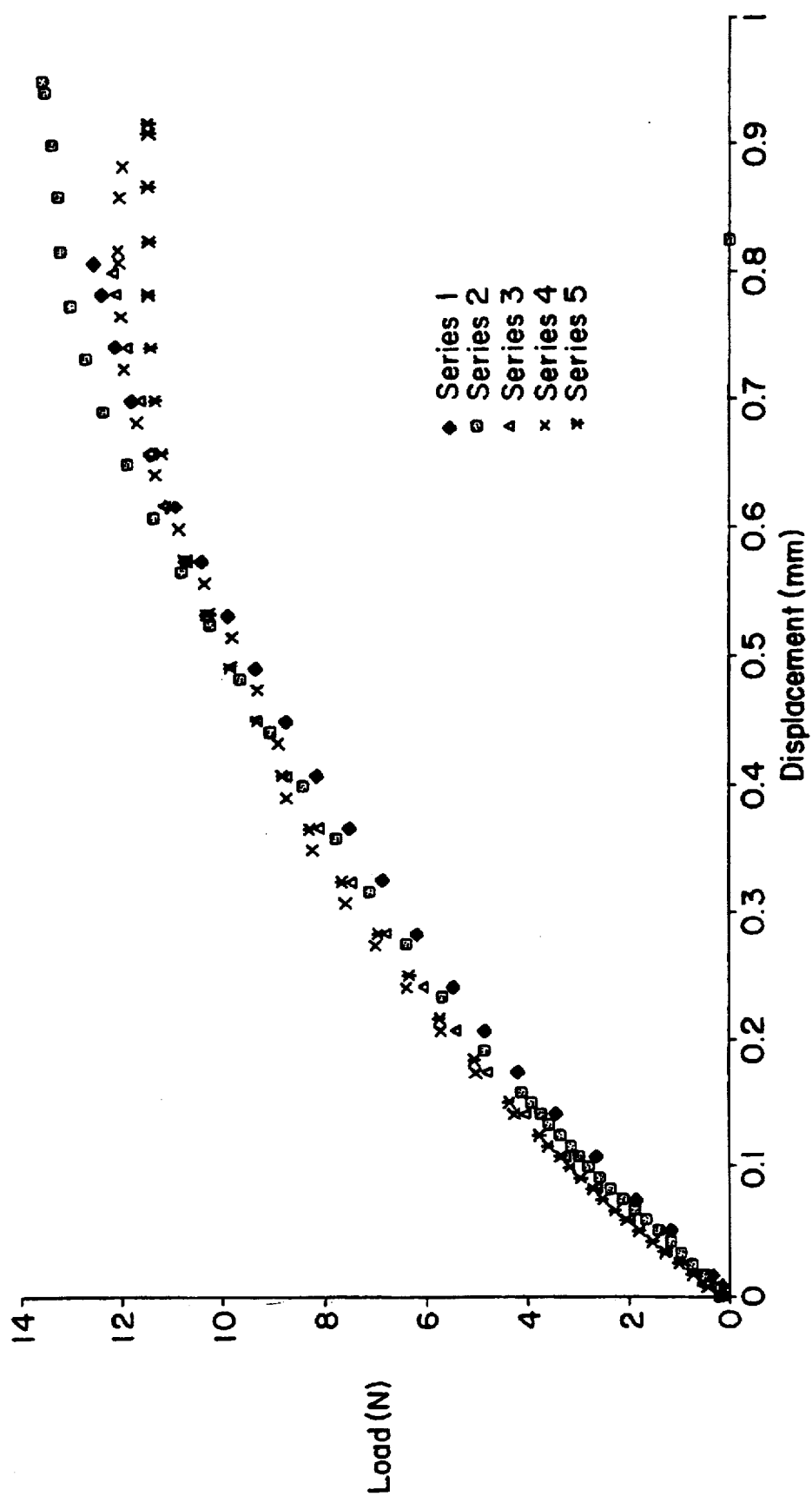
Figure 13:
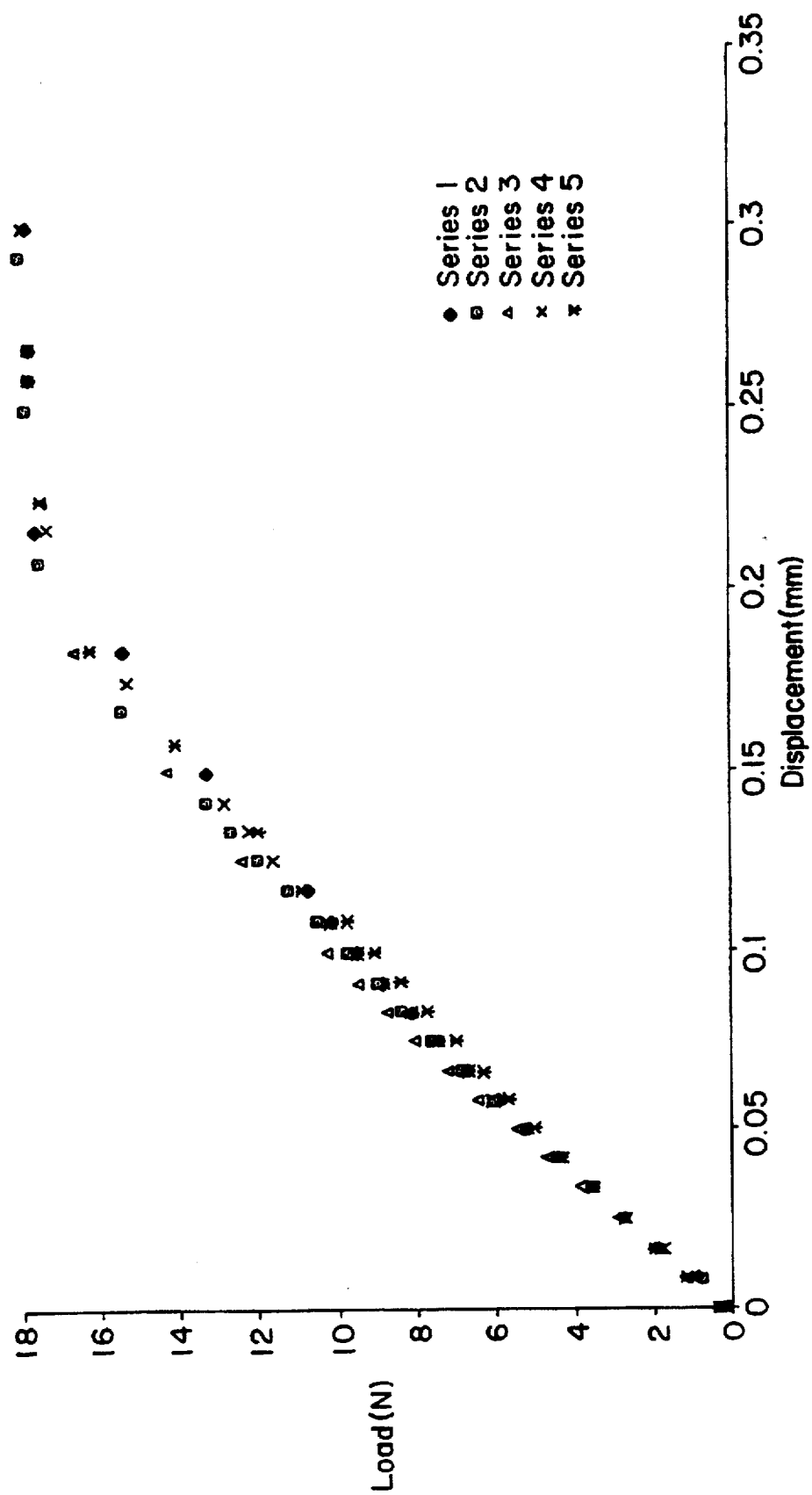
Figure 14:
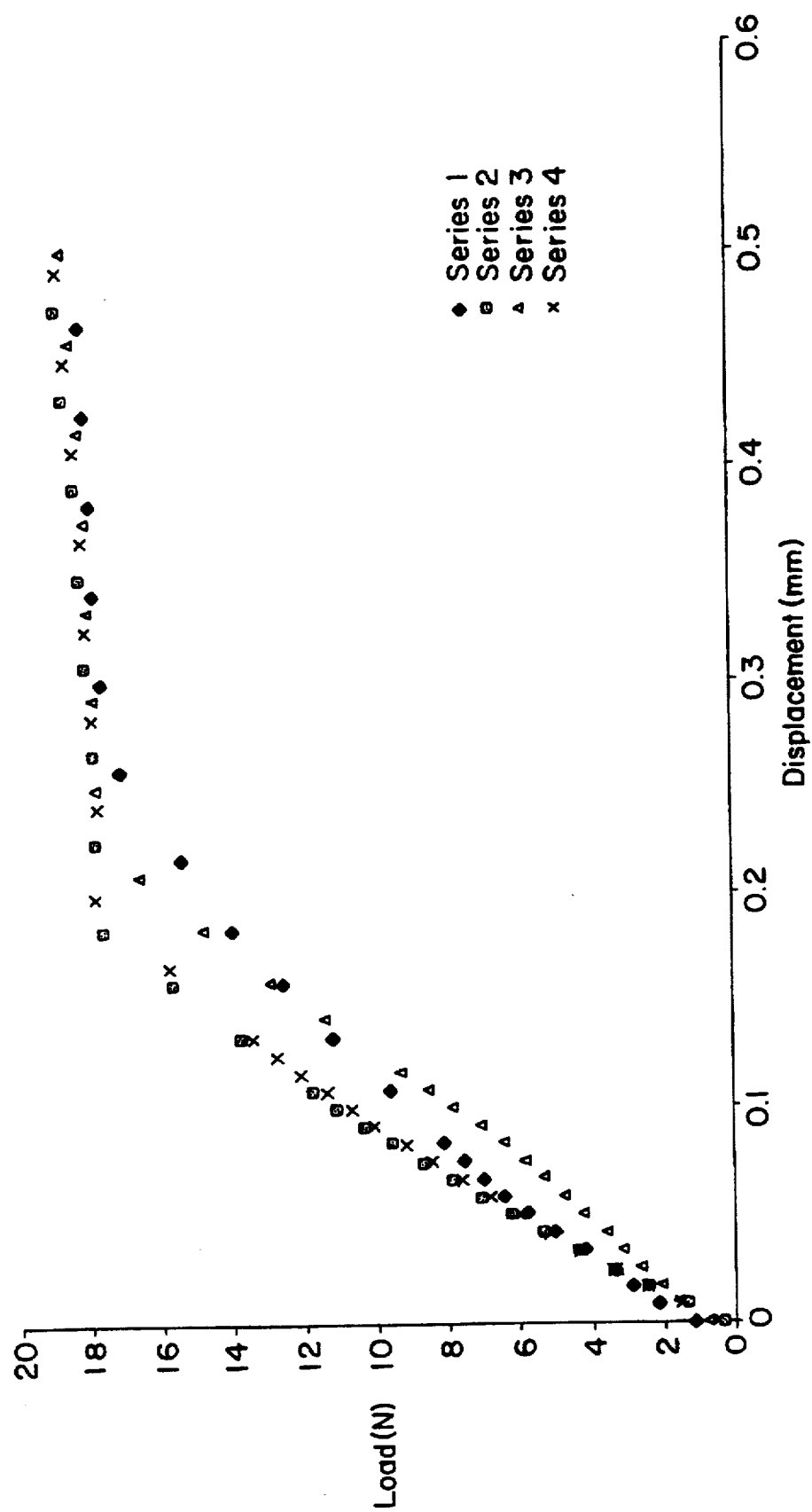

FIG. 3 shows a stick-holder 20 comprising a cylindrical barrel 21 having a bore 25, the barrel having an inwardly tapering front end portion 22. At the rear end 23 of barrel 21 is an adjustment screw 24 housing a seat (not shown) which, by rotation of the screw 24, can be moved up the bore 25. In the bore of the barrel is a stick 26 of the invention. The rearward end 27 of the stick is located in the seat, and the forward end 28 of the stick 26 protrudes beyond the front end portion 22. In use, as the front end portion 22 of the stick is consumed, the stick can be moved forward in barrel 21 by rotation of screw 24 to keep a portion of stick protruding for subsequent use.

FIGS. 4 to 14 show graphically the results of a series of indentation experiments using an Instron (model 5564) Tensile Tester. In these experiments a steel ball mounted on a shaft and linked to a load cell was driven into a block of test material at a fixed rate and a plot of load versus displacement was obtained. Multiple measurements were carried out on each sample.

Tests were carried out using two ball sizes and various indentation speeds. The sets of curves were obtained using a ball of 2.5 mm diameter and indentation speeds of 2 and 5 m/min. The following Table identifies test materials and indentation speeds with respect to the graphs.

| TEST MATERIAL | 2 mm/min | 5 mm/min |
| --- | --- | --- |
| Paraffin wax | PW3 | PW4 |
| Wax crayon | WC 1 | WC 2/WC 3 |
| Pentel "Keskal" correction stick | Kes 1 | Kes 2 |
| Gillette stick 1 | GLC 1 | GLC 2 |
| Gillette stick 2 | BLC 1 | BLC 2 |

The two Gillette sticks are both of the composition of Example 17, but differ in date of manufacture, the material used in stick 2 having been prepared within the previous 7 days while that used in stick 1 was several months old.

It is plain that the results for the two compositions of the invention (GLC 1, BLC 1; and GLC 2, BLC 2) are quite different from the results for the other materials which are not in accordance with the invention. Thus, FIGS. 7, 8 and 13, 14 show a substantially linear relation between increasing load and resulting displacement until a value of load is reached at which a plateau results. This occurs at a particular and reproducible value of the load, and this behaviour is quite different from, and clearly distinguishable over, that of the other materials. The shape of the graphs of the materials of the invention indicates a sudden change in phase from solid to liquid in the area where the load is applied, and thereafter further displacement occurs without the necessity to increase load. At this load in the test, the material liquefies or becomes fluid, and this is the state in which, in use of the materials, they are laid down as a thin layer on a substrate. Removal of the load results in immediate resolidification.

The wax materials tested show a conventional profile to the load displacement curve with no sudden dislocations to indicate a change of state. The variations between curves are a result of breakdown (disintegration) of the samples.

We claim:

1. A correction or marking material which comprises a correction or marking agent dispersed in a solid carrier, which carrier upon working contact with a substrate becomes temporarily liquid to deposit thereon as a dry coating including said agent therein and having essentially the same composition as said correction or marking material.

2. A correction or marking material which comprises a correction or marking agent in a solid synthetic matrix, which material in use, when moved in contact with and relative to a substrate, liquefies at least partially to deposit itself on the substrate as a thing coating of matrix and agent, which coating immediately resolidifies to form a dry layer having essentially the same composition as said correction or marking material.

3. A material according to claim 2, wherein the correction agent is an opacifying agent.

4. A material according to claim 3, wherein the opacifying agent is finely divided titanium dioxide.

5. A material according to claim 2, wherein the marking agent is a coloured pigment or dye.

6. A material according to claim 2, wherein the marking agent is a fluorescent material.

7. A material according to claim 2, wherein the matrix comprises a mixture of a highly crystalline aromatic fused ring compound and a long chain aliphatic alcohol.

8. A material according to claim 7, wherein the fused ring compound is abietic acid or a derivative thereof, and the long chain alcohol is selected from the group consisting of stearyl, myristyl, cetyl or lauryl alcohol.

9. A material according to claim 2, wherein the carrier or matrix comprises a mixture of a biphenyl compound and a long chain aliphatic alcohol.

10. A material according to claim 9, wherein the biphenyl compound is a carboxyl-substituted biphenyl and the alcohol is cetyl or myristyl alcohol.

11. A material according to claim 2, wherein the carrier or matrix is in the form of a rigid stick.

12. An instrument comprising a housing and within said housing a rigid stick comprising a correction or marking agent in a solid synthetic matrix, which material in use, when moved in contact with and relative to a substrate, liquefies at least partially to deposit itself on the substrate as a thin coating of matrix and agent, which coating immediately resolidifies to form a dry layer having essentially the same composition as said correction or marking material.

13. A correction or marking material which comprises a correction or marking agent in a solid carrier comprising a highly crystalline aromatic fused ring compound and a long chain aliphatic alcohol.

14. A material according to claim 13, wherein the fused ring compound is abietic acid or a derivative thereof, and the long chain alcohol is selected from the group consisting of stearyl, myristyl, cetyl or lauryl alcohol.

15. A correction or marking material which comprises a correction or marking agent in a solid carrier comprising a biphenyl compound and a long chain aliphatic alcohol.

16. A material according to claim 15, wherein the biphenyl compound is a carboxyl-substituted biphenyl and the alcohol is cetyl or myristyl alcohol.

17. A material according to claim 15, wherein the carrier or matrix is in the form of a rigid stick.

18. A material according to claim 15, wherein the agent comprises finely divided titanium dioxide.

19. A material according to claim 15, wherein the agent comprises a fluorescent material.

20. A method comprising contacting a substrate with a correction or marking material comprising a correction or marking agent dispersed in a solid carrier, said carrier upon contact with said substrate becoming temporarily liquid to deposit thereon as a dry coating having essentially the same composition as said correction or marking material.

21. A method comprising contacting a substrate with a correction or marking material comprising a correction or marking agent in a solid synthetic matrix, said material when contacted with said substrate, liquefies at least partially to deposit itself on the substrate as a thin coating of matrix and agent, which coating immediately resolidifies to form a dry layer having essentially the same composition as said correction or marking material.

22. A method comprising contacting a substrate with a correction or marking material which comprises a correction or marking agent in a solid carrier comprising a highly crystalline aromatic fused ring compound and a long chain aliphatic alcohol to transfer said correction or marking material to said substrate.

23. A method comprising contacting a substrate with a correction or marking material which comprises a correction or marking agent in a solid carrier comprising a biphenyl compound and a long chain aliphatic alcohol to transfer said correction or marking material to said substrate.

* * * * *